July 14, 1964  A. C. McDANIEL, JR  3,140,634
DRIVE MEANS FOR METAL FABRICATING APPARATUS
Filed Sept. 7, 1961  2 Sheets-Sheet 1
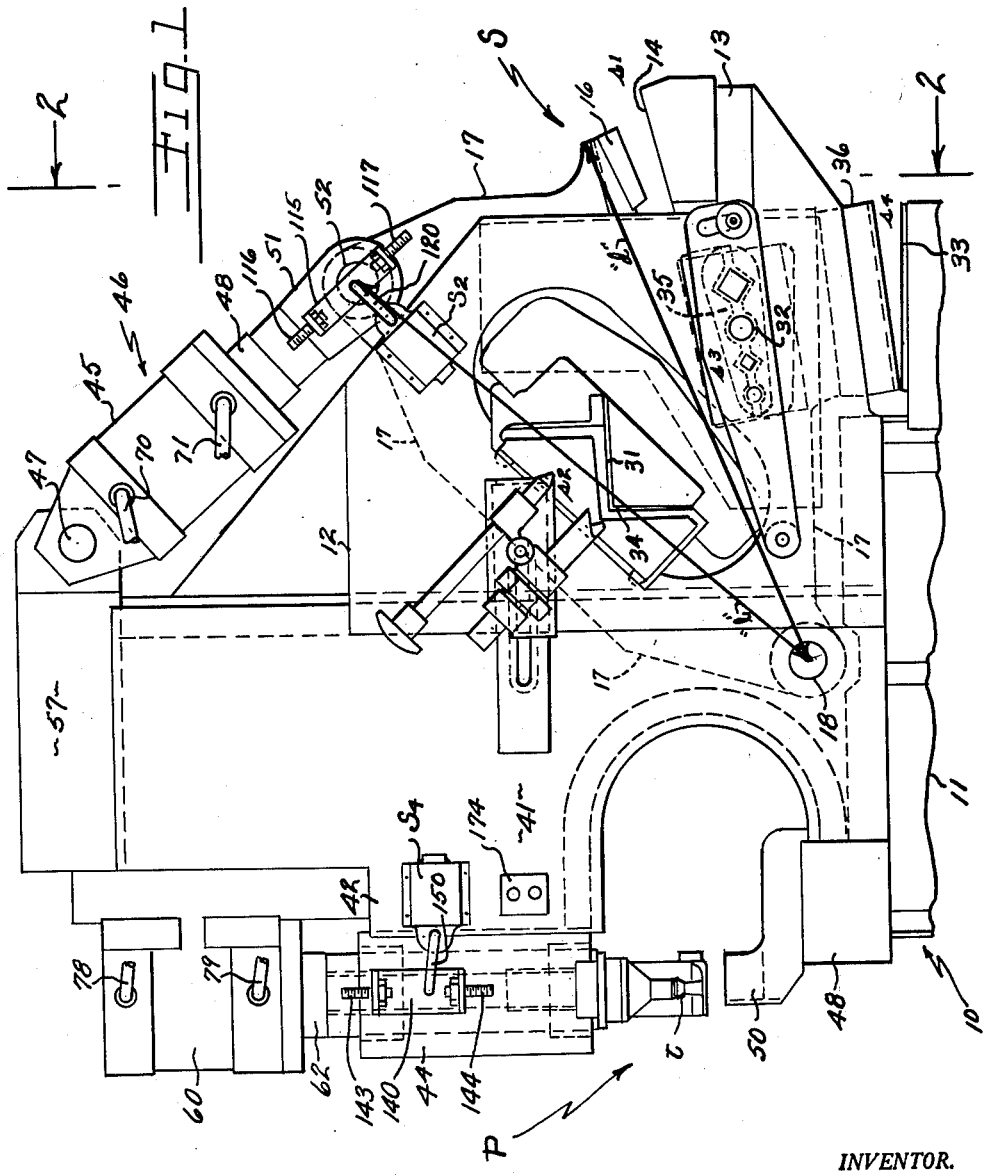
INVENTOR.
AGUSTUS C. McDANIEL JR.
BY
Meyer, Baldwin, Doran & Egan
ATTORNEYS July 14, 1964 A. C. McDANIEL, JR 3,140,634
DRIVE MEANS FOR METAL FABRICATING APPARATUS
Filed Sept. 7, 1961 2 Sheets-Sheet 2
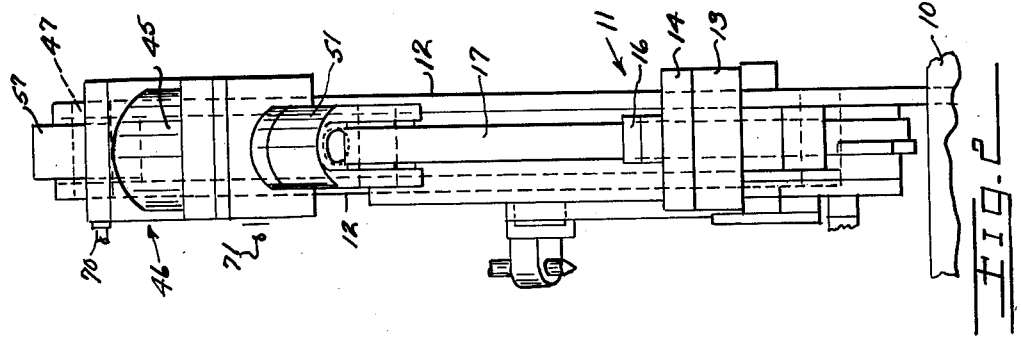
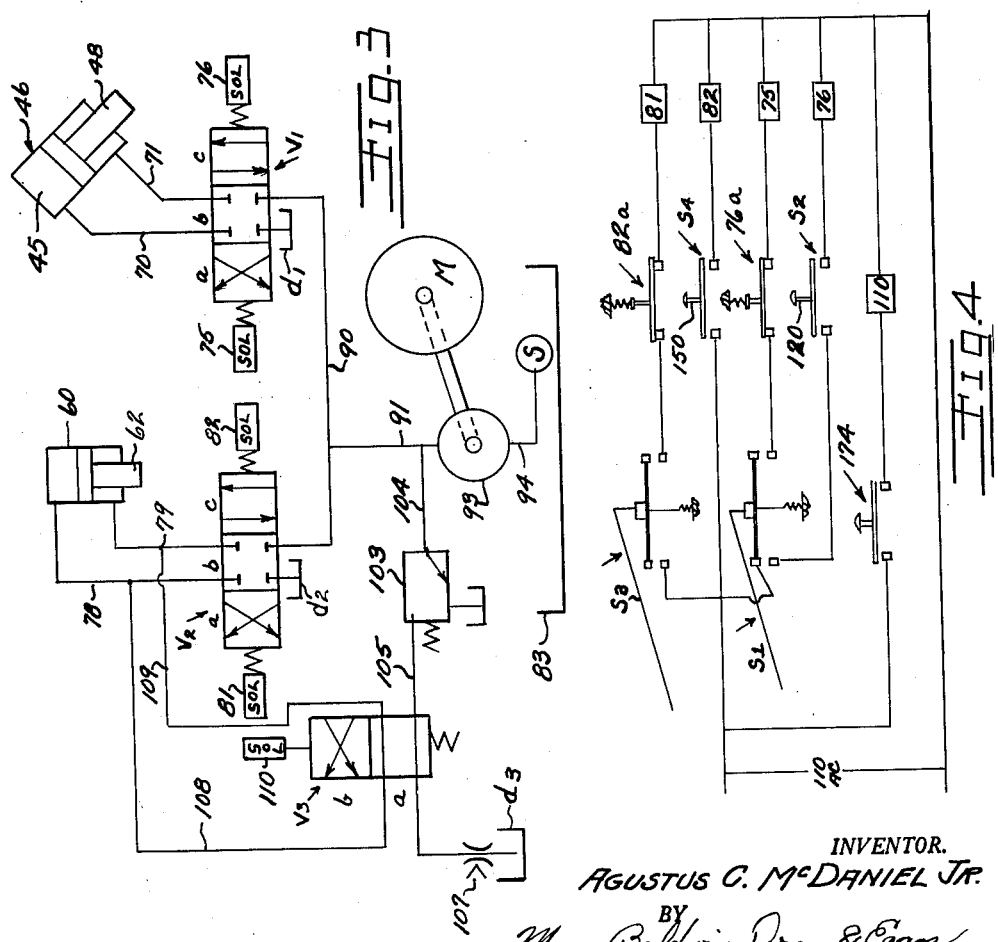
INVENTOR.
AGUSTUS C. McDANIEL JR.
BY
Meyer, Baldwin, Doran & Egan
ATTORNEYS – # United States Patent Office 3,140,634
Patented July 14, 1964

3,140,634
DRIVE MEANS FOR METAL FABRICATING
APPARATUS
Augustus C. McDaniel, Jr., Shaker Heights, Ohio, assignor to The Hill Acme Company, Cleveland, Ohio, a corporation of Ohio
Filed Sept. 7, 1961, Ser. No. 136,490
1 Claim. (Cl. 83—554)

This invention relates generally to metal working or fabricating apparatus and more particularly to novel and improved drive means especially designed for use with a metal fabricating machine, and which is operable to provide for the automatic actuation of the movable metal fabricating means of said machine.

A primary object of the present invention is to provide a new and improved drive means especially designed for use with a metal fabricating machine which has movable work fabricating means, the novel and improved drive means being adapted to provide for the automatic actuation of said movable fabricating means.

Another object of the present invention is to provide a new and improved drive means generally referred to in the art as "fluid actuatable" drive means, and which is especially designed for use with a metal fabricating machine, being operable therewith to provide for the automatic actuation of the work fabricating means of said machine.

Still another object of the present invention is to provide a new and novel fluid controlled drive means especially designed for use with a metal fabricating machine and which drive means is effective to provide a variable controlled actuation of the movable fabricating means of said machine.

Additional objects and advantages of the novel drive means of the present invention will be apparent to one skilled in the art to which it pertains and upon reference to the following disclosure of a preferred embodiment therefor and which embodiment is illustrated in the accompanying drawings wherein:

FIG. 1 is a side elevational view of a metal fabricating machine embodying the drive means of the present invention;

FIG. 2 is an end view showing the assembly of the movable fabricating means at one operator's station of the machine of FIG. 1; and FIGS. 3 and 4, respectively, are schematic diagrams of the combined hydraulic and electrical control circuit for use with the drive means of the present invention.

With reference now directed to the drawings, the drive means of the present invention is herein shown as adapted for use with a metal fabricating machine commonly referred to in the art as a combination "shear, punch and coper machine" which is capable of fabricating various structural metal forms such as bars, sheets, plates, angles and the like.

The embodiment of fabricating machine herein disclosed is capable of being operated by two individual workmen, one being located at a shearing station therefor as identified herein by the reference character S, and the second workman being located at the opposite end of said machine or at a punch station, as is indicated at P. As will later appear, the fabricating means at said machine stations S and P may be simultaneously and/or separately operated by the aforesaid workmen.

With particular reference now directed to FIGS. 1 and 2, the instant embodiment of metal fabricating machine is seen to include a frame indicated generally at 10 and which has a base 11 mounting a pair of spaced walls 12 in an upright position on the end thereof defining the aforementioned shearing station S.

A plurality of fabricating positions is provided on said frame as are indicated at $s_1$ to $s_4$, at each of which is accommodate a fixed tool or anvil, and which, in turn, is intended to cooperate with a movably actuated tool to fabricate a metallic workpiece therebetween.

More specifically, as seen in FIG. 1, a shelf 13 is provided on the end of the frame 10 defining the aforesaid fabricating position $s_1$, said shelf preferably fixedly mounting a cutting die or anvil 14 thereon, the latter being of any desired configuration, as will be understood.

Said anvil, in turn, is intended to cooperate with a shearing tool or die 16 carried on a movable shearing arm as indicated at 17, as for example a notching tool which is operable to notch an angle or like workpiece preparatory to bending the same.

The shearing arm 17 is seen to be somewhat triangular in overall configuration and is disposed between the aforesaid spaced walls 12 of the frame 10 and pivotally mounted therein at its apex by transverse shaft 18 so as to be swingable through a generally vertical plane. The shearing tool 16 is seen to be mounted on the lower corner of said triangular shaped arm 17 opposite the pivotal mounting therefor. As will be noted particularly in FIG. 1, the shaft 18 is preferably mounted within the frame below the stationary anvil or die 14 carried on the aforementioned shelf 13.

As indicated also at fabricating positions $s_2$ to $s_4$, at the operator's station S of said machine, fabricating dies 31 to 33 respectively, are mounted on the aforementioned frame walls 12, and are each intended to cooperate with a suitable corresponding shearing tool 34 to 36 respectively, carried on the shearing arm 17 being thus effective to fabricate various configurations of metal forms, such as for example metal channels being accommodated in the instant machine embodiment at position $s_2$; square and round bar stock at position $s_3$ and plate stock at position $s_4$.

As before mentioned, the instant metal working or fabricating machine is also provided with an operator's station P located at the opposite end of the machine frame 10 and at which station means are provided for punching predetermined configurations of apertures in metallic sheet, plates and the like. For this purpose, a pedestal 41 mounted on the opposite end of the base 11 and projecting vertically upwardly therefrom is formed with a suitable guide support 42 on the side thereof facing the operator's position P and in which a ram 44 is mounted so as to be vertically reciprocable therein. The ram 44 in turn, is seen to mount a punching tool "t" on its lower end, which tool may partake of various configurations as will be understood.

An anvil support is attached to the machine frame 10 below the ram 44 and carries an anvil or punching die 50 with which said ram and punching tool are intended to cooperate so as to fabricate a workpiece placed thereon.

As is previously mentioned, the subject matter of the present invention is directed to novel and improved drive means for automatically actuating the movable fabricating means at each of the operator's stations S and P whereby said fabricating means may be simultaneously and/or separately actuated by the workmen at said stations to thus fabricate a metallic workpiece placed thereat.

To actuate the shearing arm 17 at station S, the aforesaid frame pedestal 41 mounts an anchor plate 57 to one end of which the closed end of cylinder 45 of a double acting hydraulic motor 46 is swivelly attached as indicated at 47. The piston arm 48 of said hydraulic motor preferably mounts a clevis 51 on its free end, the latter in turn, being pivotally attached to the upper corner of the shearing arm 17 as seen at 52 remote from its pivotal connection 18 with the machine frame 10.

As noted particularly in FIG. 1, the lever arm defined between the shearing arm pivot 18 and the pivotal attachment for the hydraulic motor 46, which lever arm is herein defined by the reference character 11, is slightly greater than the distance between said shearing arm pivot and the lower corner of the shearing arm mounting the aforesaid shearing tool 16, the latter being herein identified at "d," said lever arm thus providing a maximum torque for application to said arm during its working or shearing stroke.

As will likewise be apparent, with the hydraulic motor 46 connected to the shearing arm in the manner just described, a maximum torque will likewise be applied thereto when utilizing the fabricating tools at shearing positions $s_2$, $s_3$ and $s_4$ since the tools 35, 35 and 36 carried on said arm at said shearing positions are each disposed at a lesser distance from said arm pivotal connection 18 than said tool 16.

To actuate the ram 44 at operator's station P, a reversible hydraulic motor 60, as best seen in FIG. 1, is mounted on the aforementioned frame pedestal 41 above the ram support 42 to thus position its piston rod 62 whereby it may be attached to the upper end of said ram opposite the punching tool $t$.

Upon actuation of said hydraulic motor, the ram 44 and tool $t$ carried thereon is intended to be vertically reciprocably moved along the aforementioned guide support 42 being thus effective to be carried into punching relation with the anvil or punching die 50 mounted on the anvil support 48 to thereby fabricate a workpiece therebetween.

Control means now to be described, are provided at each of the aforementioned operator's stations S and P of the said machine, being thus effective to provide for the simultaneous and/or individual operation of the shearing arm 17 and reciprocal ram 45, respectively, to thereby enable a fabrication of metallic workpiece and/or workpieces at said stations.

As one embodiment of control means capable of accomplishing this result, reference is now directed to FIGS. 3 and 4 wherein are shown a combination electro-hydraulic control circuit connectable in controlling relation with the aforementioned double acting hydraulic motors 46 and 60 and thus capable of providing for the controlled operation for the same.

As seen in the hydraulic circuit of FIG. 3, the opposite ends of the cylinder 45 of hydraulic motor 46 are connectable into said control circuit by means of conduits 70 and 71, the latter being, in turn, connected to a three position control valve $V_1$, of conventional design shown herein schematically as having positions $a$, $b$, and $c$, said valve being of such construction as to be automatically "spring returned" to its center "$b$" position upon its being non-actuated.

Said valve $V_1$ is intended to be actuated by suitable solenoids 75 and 76 to either of its "actuated" $a$ or $c$ positions.

In like manner, a similar three position control valve $V_2$ is seen to be connected by conduits 78 and 79 to the opposite ends of the cylinder for hydraulic motor 60. The valve $V_2$ is likewise provided with three positions $a$, $b$, and $c$, the center position "$b$" therefor being the position to which the valve is normally "spring returnable" as is control valve $V_1$. Said control valve $V_2$ is likewise intended to be actuated to either of its "$a$" and "$c$" positions by solenoids 81 and 82.

A source of suitable hydraulic fluid as identified at 83 is connected through a common conduit 90 to each of said control valves $V_1$ and $V_2$, said common conduit connecting with junction conduit 91 to the outlet of a conventional fluid pump 93, said pump in turn being driven by motor M, the inlet end of said pump connecting to conduit 94 to said fluid source 83.

Valves $V_1$ and $V_2$ are likewise seen to be connected to drain sumps $d_1$ and $d_2$, respectively.

Said control circuit is likewise provided with a conventional pressure relief valve 103 connectable by conduit 104 to the aforementioned junction conduit 91, said pressure relief valve being operable to partially reduce the fluid pressure in its outlet conduit 105, the purpose for which will be presently described.

The conduit 105 is seen to connect to a two position control valve $V_3$, said valve connecting alternately to a sump or drain $d_3$ through needle valve 107 or through conduit 108 to the aforementioned conduit 78, communicating with the upper end of the cylinder of the motor 60 for the punching ram 44.

Conduit 109 is likewise seen to connect at one end to control valve $V_3$ and its opposite end to the conduit 79, the latter connecting in turn as aforesaid to the bottom end of the cylinder for ram motor 60.

A solenoid 110 is connected to the control valve $V_3$ and is operable to automatically move the same to either of its "two positions" hereinafter referred to as "$a$" and "$b$" positions.

As is aforementioned, the control circuit includes electrical control means actuatable by the operators at machine stations S and/or P for automatically causing the movement of the shearing arm 17 and/or ram 44.

For this purpose, a foot operated switch $S_1$ as seen in FIG. 4 is connected in series with solenoid 75, said circuit being connected in parallel with a normally open switch $S_2$, the latter being connected in series with solenoid 76, said combined parallel circuit, in turn, being connected to a suitable source of electric potential, such as for example 110 volts A.C. The solenoid 76 is likewise seen to have a normally closed contact 76a in series with said switch $S_1$ and solenoid 75.

As may be best seen in FIG. 1, the switch $S_2$ is mounted on the machine frame 10 adjacent the clevis 51 attaching the shearing arm 17 to the hydraulic motor piston 48, said clevis also mounting a bracket 115 on its adjacent side face. Said bracket is preferably of C-shaped configuration and is seen to carry a pair of threaded pins 116 and 117, respectively, on its opposed ends and which are engageable with the switch actuating arm 120 of the switch $S_2$ being thus effective to actuate the latter in the course of the shearing arm 17 being swung through its working stroke.

With this electrical circuitry, upon the operator at machine station S depressing the foot operated switch $S_1$ so as to close the same, the solenoid 75 will be energized and thus effective to move the control valve $V_1$ to its "$a$" position whereby the pressurized fluid in common line 90 is connected by conduit 70 to the upper end of the motor cylinder 45 so as to power its piston rod 48 downwardly and thus swing the shearing arm 17 through its "shearing" stroke.

In this position of said valve, the opposite end of said cylinder 45 is connectable through conduit 71 to drain $d_1$.

At a predetermined instant in the downward shearing stroke of the hydraulic cylinder, the switch $S_2$ is actuated by the threaded pin 116 to its "closed" position whereby solenoid 76 is energized and which is effective to actuate the control valve $V_1$ to its "$c$" position. At the same time the "normally closed" contact 76a of solenoid 76 in series with solenoid 75 is opened so as to de-energize the latter.

By threadably adjusting the pins 116 and 117 in the bracket 115 the switch $S_2$ may be actuated at any predetermined instant in said shearing cycle.

As a result, conduit 71 is connected to the pressurized fluid source in conduit 90 whereby the hydraulic motor 70 is reversibly actuated being effective to raise the shearing arm 17 upwardly to a position approximately as is shown in FIG. 1.

Upon the shearing arm being thus raised, the threaded pin 117 carried on bracket 115 is effective to operate switch $S_2$ to its "open" position thus de-energizing solenoid 76 whereby the control valve $V_1$ returns to its center "$b$" position disconnecting conduits 70 and 71 from the aforesaid fluid source and drain $d_1$ thus locking said shearing arm 17 in its raised position due to the hydraulic fluid in the lower end of the cylinder 45. Upon the de-energization of solenoid 76 its contact 76a is again closed to thus ready the electrical control circuit for a subsequent shearing cycle of operation.

In like manner, the ram 44 at the operator's punching station P may likewise be automatically actuated through its punching cycle, the operator at said station P actuating foot controlled switch $S_3$ which is effective to energize solenoid 81 and move the control valve $V_2$ to its "$a$" position and thereby connect the ram hydraulic motor 60 to the source of pressure fluid through conduits 90 and 78 thus causing the ram 44 to be powered downwardly to carry the tool $t$ thereon through its punching stroke.

As best seen in FIG. 1, the ram carries a bracket 140 similar to bracket 115 and which mounts a pair of threaded pins 143 and 144 on its opposed ends and which are adapted upon movement of the ram to engage the switch arm 150 of a switch $S_4$ carried on the adjacent frame pedestal 41.

When the ram is powered downwardly the threaded pin 143 is intended to operate switch $S_4$ to its closed position at a predetermined instant in said stroke thus energizing, in turn, solenoid 82 so as to move the control valve $V_2$ to its "$c$" position. As a result the hydraulic cylinder is reversibly actuated and thereby effective to stop said downward movement and force the ram upwardly away from the aforesaid punch anvil 48 thus completing the working or punching stroke for the said ram. As will be understood, the pin 143 is intended to cause the actuation of switch $S_4$ preferably just after the tool $t$ is carried through the workpiece.

Solenoid 82 is also provided with contacts 82a in series between the switch $S_3$ and solenoid 81 and which open upon the solenoid 82 being energized to thereby disconnect solenoid 81 from said electrical power source at the bottom of the punching stroke for said ram 44.

As said ram is thus moved upwardly, the threaded pin 144 is intended to again actuate switch $S_4$ to its open position effective to disconnect the solenoid 82 from said source whereby the control valve $V_2$ automatically returns to its center or "$b$" position such that said hydraulic cylinder is disconnected from the hydraulic fluid source and the ram 44 is locked in said elevated position.

As will also be apparent, the pins 143 and 144 may be threadedly adjusted within the bracket 140 so as to enable the switch $S_4$ to be actuated at any predetermined instant in said punch cycle.

The instant embodiment of electro-hydraulic control circuit also utilizes means to enable the ram to be lowered along its guide support 42 in substantially small increments of movement so that the tool carried on the lower end of said ram may be brought into intimate relation to a workpiece supported on the anvil 50 prior to the ram being powered so as to carry said tool through its punching stroke. This feature is oftentimes important when it is desired to accurately locate the placement of the punching tool relative to the workpiece.

For this purpose, the aforementioned pressure relief valve 103 as will be understood is operable to reduce the pressure of the hydraulic fluid in its outlet conduit 105 to a predetermined magnitude. Outlet conduit 105 is connected to a two position control valve $V_3$, the "$a$" position therefor connecting said conduit to a needle valve 107 and sump $d_3$, said needle valve operating to maintain the pressure in said outlet line at said reduced magnitude as will be understood. The "$b$" position for said control valve $V_3$ is operable to connect said reduced pressurized hydraulic fluid to the aforementioned ram hydraulic motor 60, through conduits 108 and 78 which is effective to cause the incremental downward movement of said motor piston rod 62 and connected ram 44 effective to bring the ram tool $t$ into intimate engagement with the workpiece supported on the aforementioned anvil 50. The bottom end of the cylinder for motor 60 is likewise connected through the valve $V_3$ in its "$b$" position through conduit 109 to the sump $d_3$.

The control valve $V_3$ is preferably regulated in its movement by electric control means which, in the instant electro-hydraulic control circuit comprises the aforementioned solenoid 110 which, in turn, is connected across a normally open push button 174 of conventional design and which is conveniently located on the machine pedestal 41 and in the position to be operated by the workman at the machine station P.

In this manner, as will be understood repetitive actuations of this push button 174 and its resultant operation of the solenoid 110 will be effective to successively operate the control valve $V_3$ and incrementally lower or "inch" the ram and tool carried thereon toward the workpiece supported on the anvil 50 whereby said workpiece may be accurately positioned relative to said tool whereupon subsequent operation of the ram will be effective to accurately locate the aperture formed therein.

As is now apparent, the control circuit as just described enables separate and/or simultaneous actuation of the shearing arm 17 and punch ram 44 by the operators at the aforementioned shearing and punch stations S and P, respectively.

As will also be apparent, said control circuit may be modified if so desired whereby said shearing arm 17 and ram 44 may also be alternately operated. For example, merely by connecting the control valves $V_1$ and $V_2$ in tandem or series in the conduit 90, hydraulic fluid may be applied to either but not both, the ram or shearing arm.

Other modifications, arrangements and combinations of parts of the several components comprising the present invention will be readily apparent to one skilled in the art to which it pertains without departing from the inventive concepts thereof as are defined in the claim.

What is claimed is:

A hydraulic control circuit for use in a combination shear and punching apparatus having movable shear and punching means and reversibly actuatable drive means separately hydraulically operable for moving said shear and punching means, comprising a source of hydraulic fluid, first conduit means connecting to said source, a pair of hydraulic valves connected in parallel with said first conduit means, second conduit means connecting with one of said valves and the drive means for said shear means, third conduit means connecting the other of said valves and the drive means for said punching means, means for actuating said one valve effective to connect the drive means for said shear means in hydraulic communication with said source through said first and second conduit means so as to move said shear means in a first direction in its shearing stroke, means actuatable by said shear means during said stroke effective to actuate said one valve and reversibly connect said drive means for said shear means in hydraulic communication with said source so as to move said shear means in a second direction, means for actuating said other valve effective to connect the drive means for said punch means in hydraulic communication with said source through said first and third conduit means so as to move said punch means in a first direction in its punching stroke, and means actuatable by said punch means during said stroke effective to actuate said other valve and reversibly connect said drive means for said punch means in hydraulic communication with said source so as to move said punch means in a second direction, fourth conduit means connecting with said first conduit means, a relief valve connecting at its inlet to said fourth conduit means, third valve means connecting with the outlet of said relief valve, fifth conduit means bypassing the other of said pair of valve means and connecting between said third valve means and said drive means for said punching means, means for repetitively actuating said valve means effective to connect the drive means for said punch means in hydraulic communication with said source through said first and fourth conduit means so as to incrementally move said punching means through its punching stroke.

References Cited in the file of this patent

UNITED STATES PATENTS

| | | |
|---|---|---|
| 1,006,761 | Kraut | Oct. 24, 1911 |
| 1,112,076 | McGorvin | Sept. 29, 1914 |
| 1,380,249 | Rehfuss | May 31, 1921 |
| 2,603,255 | Woolery | July 15, 1952 |
| 2,666,417 | Harsch | Jan. 19, 1954 |
| 2,970,505 | Geenen | Feb. 7, 1961 |
| 3,004,458 | Dvorak | Oct. 17, 1961 |
| 3,055,245 | McKay | Sept. 25, 1962 |
| 3,081,659 | Theobald | Mar. 19, 1963 |

FOREIGN PATENTS

| | | |
|---|---|---|
| 477,380 | France | Oct. 15, 1915 |
| 860,932 | Great Britain | Feb. 15, 1961 |